United States Patent
Heese et al.

(10) Patent No.: US 6,194,805 B1
(45) Date of Patent: Feb. 27, 2001

(54) RELUCTANCE MOTOR ELECTRIC MACHINE

(75) Inventors: Thomas Heese; Markus Heidrich, both of Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,392

(22) PCT Filed: Apr. 1, 1999

(86) PCT No.: PCT/DE99/00988
§ 371 Date: May 15, 2000
§ 102(e) Date: May 15, 2000

(87) PCT Pub. No.: WO00/03469
PCT Pub. Date: Jan. 20, 2000

(30) Foreign Application Priority Data

Jul. 11, 1998 (DE) .............................. 198 31 165

(51) Int. Cl.[7] .............................. H02K 19/06; H02K 1/24
(52) U.S. Cl. ................................. 310/166; 310/168
(58) Field of Search .................... 310/166, 168, 310/169, 162, 163, 193, 209, 254, 216, 259; 29/596–598

(56) References Cited

U.S. PATENT DOCUMENTS

| | | | |
|---|---|---|---|
| 5,168,190 | * 12/1992 | Bahn | 310/166 |
| 5,652,493 | * 7/1997 | Hendershot, Jr. | 318/701 |
| 5,737,164 | * 4/1998 | Ferreira et al. | 310/168 |
| 5,866,964 | * 2/1999 | Li | 310/198 |
| 6,028,385 | * 2/2000 | Pengov et al. | 310/166 |
| 6,051,903 | * 4/2000 | Pengov | 310/168 |

FOREIGN PATENT DOCUMENTS 11-346464 * 12/1999 (JP) .

* cited by examiner

*Primary Examiner*—Tran Nguyen
(74) *Attorney, Agent, or Firm*—Ronald E. Greigg; Edwin E. Greigg

(57) ABSTRACT

A reluctance motor electric machine including a number of stator pole teeth and a number of rotor pole teeth selected so that with a minimal reluctance, due to the rotational alignment of the rotor in relation to the stator, three air gaps that can be flowed through are produced between three pairs of stator pole teeth and rotor pole teeth. This results in the fact that now three regions of the yoke body are elastically pulled in the direction of the rotor rotational axis and consequently, the elastically deformed zones of the yoke body only extend over essentially and therefore act in a more rigid fashion. This results in the advantage that with the same excitation frequency, the deformations take place with small amplitudes and therefore with less generation of noise.

12 Claims, 2 Drawing Sheets

RELUCTANCE MOTOR ELECTRIC MACHINE

BACKGROUND OF THE INVENTION

The invention relates to a reluctance motor electric machine.

The references DE 42 12 547 C2, U.S. Pat. No. 5,266,859, and WO 92/10022 have disclosed electric machines of this kind, which can be operated as reluctance motors. Each electric machine having a respective stator with an essentially annular yoke body, stator pole teeth extending radially inward from this yoke body, and excitation coils associated with the stator pole teeth. Each electric machine having a rotor which is supported so that the rotor can rotate around a rotor axis and has rotor pole teeth that are directed radially outward, which temporarily form pairs with respective stator pole teeth that coincide with them, enclosing an air gap between these respective teeth. There is a minimal reluctance in a pair that is aligned in this manner.

In the reluctance motor according to DE 42 12 547 C2, the rotor has four rotor pole teeth aligned crosswise and the stator has six stator pole teeth aligned at regular angular intervals, wherein the stator pole teeth are each enclosed by an excitation coil winding. By means of its FIG. 1, DE 42 12 547 C2 shows that two respective rotor pole teeth and two stator pole teeth coincide at the same time, which produces simultaneous tensile forces directed radially inward on diametrically opposed stator pole teeth, which leads to an elastic, elliptical deformation of the for example circular ring-shaped yoke body that connects the stator pole teeth to one another. After the excitation coils which produce these tensile forces are switched off and after the disappearance of the magnetic field in these stator pole teeth, the yoke body springs back into its original shape and even beyond this. With rotation of the rotor around one revolution, the yoke body is elliptically deformed six times. The elliptical deformations and their frequency produce annoying noise, which according to the teaching of DE 42 12 547 C2 can be counteracted by reinforcing the yoke body in a manner described in conjunction with FIG. 2 of this reference so that the yoke body is delimited hexagonally on the outside. A reinforcement of this kind increases the natural oscillation frequency of the yoke body or the stator so that with a constant excitation frequency or constant motor speed, the excited oscillation amplitudes are smaller, with the desired result that less noise is generated.

The reluctance motor according to U.S. Pat. No. 5,266,859 likewise has four rotor pole teeth and six stator pole teeth as well as a circular ring-shaped yoke body from which the stator pole teeth protrude radially inward. In order to reduce operating noise, stamped plates, which constitute the rotor and the stator, are twisted like screws in relation to one another and are combined into packets, by means of which the elastic deformations of plates of the stator and/or rotor take place in a time-delayed fashion and there is also a reduction in noise.

The reluctance motor according to WO 92/10022 has a stator with a circular, annular yoke body and ten stator pole teeth leading inward from the yoke body at regular angular intervals. A rotor of this reluctance motor has eight rotor pole teeth and every two of these neighboring rotor pole teeth are combined into pairs which have an angular spacing that corresponds to that of the stator pole teeth. During operation of this reluctance motor, in rotational positions of the rotor which cause minimal reluctance, four air gaps are magnetically flowed through, wherein stator pole teeth disposed diagonally opposite from each other are loaded radially inward in pairs and the yoke ring of the stator therefore receives an essentially elliptical elastic deformation which also causes the generation of noise. The existence of four recurring air gaps is required for a torque delivery of the rotor.

SUMMARY OF THE INVENTION

The electric machine, in particular a reluctance motor, has the advantage that forces directed radially inward by stator pole teeth, which act on the yoke body, instead of producing an essentially elliptical deformation of the yoke ring in accordance with the prior art, now produce a deformation with a shape that is similar to a triangle, but which has sharply rounded curved regions in lieu of corners. It is clear that the yoke body, through the action of stator pole tooth forces, has three sharply curved zones and three less curved zones in the vicinity of the air gaps. Correspondingly, the yoke body or the stator behaves in a more rigid manner and with comparable dimensions, has an oscillation behavior with a higher natural frequency. This has the advantage of resulting in a greater distance between an electromagnetically induced predetermined excitation frequency and the natural resonance of the stator, which leads to the fact that an oscillation excitation by way of electromagnetic forces is less effective and causes less noise.

Less radial spring deflection of the yoke ring also results in less air gap change and therefore smaller high frequency fluctuations of forces acting on the rotor in the circumference direction and therefore smaller high frequency fluctuations of torques.

Advantageous improvements of the electric machine, in particular a reluctance motor, are possible by means of the measures taken hereinafter.

The improvement has the advantage that magnetic forces acting on the two rotor pole teeth with the smaller cross sections are essentially half as great as the force that comes from the stator pole tooth with the greatest cross section. In other words: magnetic flux through a wide stator pole tooth is divided in the yoke body into two fluxes travelling essentially in a mirror inverted fashion relative to one another, which, by means of the stator pole teeth with the smaller cross sections, and thereby with essentially the same flux density as in the large stator tooth cross section, travel to the air gap and the through this air gap into the rotor and finally through another air gap to the above-mentioned stator pole tooth with the large cross section. This is an advantageous electromagnetic utilization of the electric machine according to the invention with the advantage of a favorable torque delivery of this electric machine.

The feature combinations disclosed concretely indicate five different exemplary embodiments. From these five exemplary embodiments, one skilled in the art of drive technology can, for example, choose between embodiments to be operated in three-phase or exemplary embodiments to be operated in four-phase. It is known that the cost of electronic switching is cheaper for three-phase operation than it is for four-phase operation. On the other hand, though, a more uniform production of torque can be expected from operation with four phases.

BRIEF DESCRIPTION OF THE DRAWINGS

Five exemplary embodiments of the invention are schematically represented in FIGS. 1 to 5.

DETAILED DESCRIPTION OF THE PREFERRED EMBODIMENTS

Figure 1:
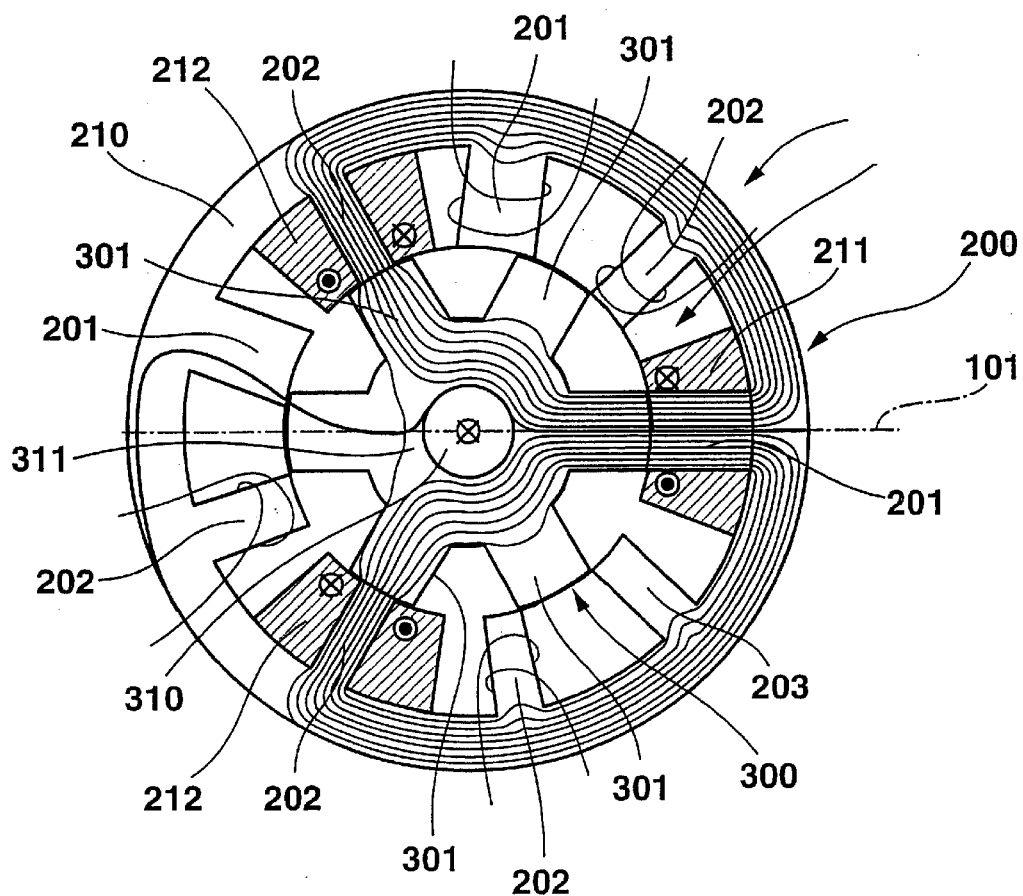
FIG. 1 is a sectional view in which the electric machine can be operated as a reluctance motor.

FIG. 1 shows a first exemplary embodiment of an electric machine 100, which can be operated as a reluctance motor and has a stator 200 and a rotor 300.

The rotor 300 has a rotor rotation axis 310 and six equally spaced rotor pole teeth 301 aligned radial to this axis. The rotor pole teeth 301 are connected to one another by means of a magnetic flux conducting body 311 that is embodied after the fashion of a hub and is of one piece with the rotor pole teeth 301. In a known manner, the rotor pole teeth 301, together with their magnetic flux conducting body 311, are comprised of laminated stamped cut-outs, which are comprised for example of dynamo sheet. The rotor pole teeth 301 are spaced apart from one another at uniform angular intervals. Because of the number 6, the angular intervals are 60° on their centers.

The stator 200 has a yoke body 210 that is essentially closed in an annular fashion and has first stator pole teeth 201 leading radially inward from this yoke body and also has second rotor pole teeth 202 likewise leading radially inward. In this connection, the stator 200 can also be comprised in a known manner of laminated stamped cut-outs which are comprised for example of dynamo sheet.

There are three first stator pole teeth 201 with a dimension extending in the circumference direction of the rotor 300 that essentially corresponds to that of the rotor pole teeth 301. For the further explanation of the design of the electric machine according to the invention as a reluctance motor, a reference plane 101 is placed through the rotor rotational axis 310 and thereby also through the center of one of the first stator pole teeth 201. In FIG. 1, this is the first stator pole tooth 201 disposed to the right of the rotor rotational axis 310. Second stator pole teeth 202, which are arranged in a mirror inverted fashion relative to the reference plane 101 are disposed at respective angular intervals of 120° starting from a center of this first stator pole tooth 201 to a center of the next pole teeth 201 and thereby also from the reference plane 101 both clockwise and counter clockwise. It is clear from FIG. 1 that rotor pole teeth 301 are aligned in relation to these second stator pole teeth 202.

An excitation coil 211 is associated with the first stator pole tooth 201. In the example, excitation coils 212 are also associated with the second stator pole teeth 202. The excitation coils 211 and 212 are wound and connected in such a way that they produce a so-called phase and thereby, in accordance with current directions indicated by crosses in circles and points in circles, they generate a magnetic flux progression which is shown in FIG. 1 and is embodied essentially in a mirror inverted fashion relative to the reference plane 101. FIG. 1 also shows that in the circumference direction of the stator 200, the second stator pole teeth 202 have essentially only half the dimension of the first stator pole teeth 201. As a result, magnetic flux densities in air gaps between rotor pole teeth 301 and a first stator pole tooth 201 as well as the sum of two second stator pole teeth 202 are essentially of the same magnitude so that if the excitation coils 211 and 212 are supplied with power, two second stator pole teeth 202 exert forces on the rotor 300 that are half the magnitude of a force in the vicinity of the air gap between the rotor 300 and the first stator pole tooth 201. In the current example, when the magnet coils 211 and 212 are excited, due to the three pairs of effective rotor pole teeth 301 and stator pole teeth 201, 202, three force components directed toward the rotor rotational axis 310 are effective, which cause a radially inward-directed elastic deformation of the yoke ring 210. For this reason, a stator 200 that is excited in this way has an oscillation behavior that differs from the prior art described in the introduction to the specification. It is clear that instead of the two oscillating zones in the prior art, which each extended for 180° of the circumference of a stator, there are now three oscillating zones that essentially extend 120°, with the advantage of a more rigid behavior, which leads to a higher natural frequency and, with a predetermined excitation frequency, leads to smaller oscillation amplitudes and less noise generation.

For the sake of simplicity, only the three excitation coils 211, 212 for the three air gaps are shown, which in the position of the rotor 300 shown, permit the most powerful magnetic flux to be produced and are associated with the three effective pairs of rotor pole teeth 301 and stator pole teeth 201, 202. It goes without saying that the other stator poles are likewise associated with coils, which for the sake of clarity are shown here only through the indication of windings that are not shown.

Figure 2:
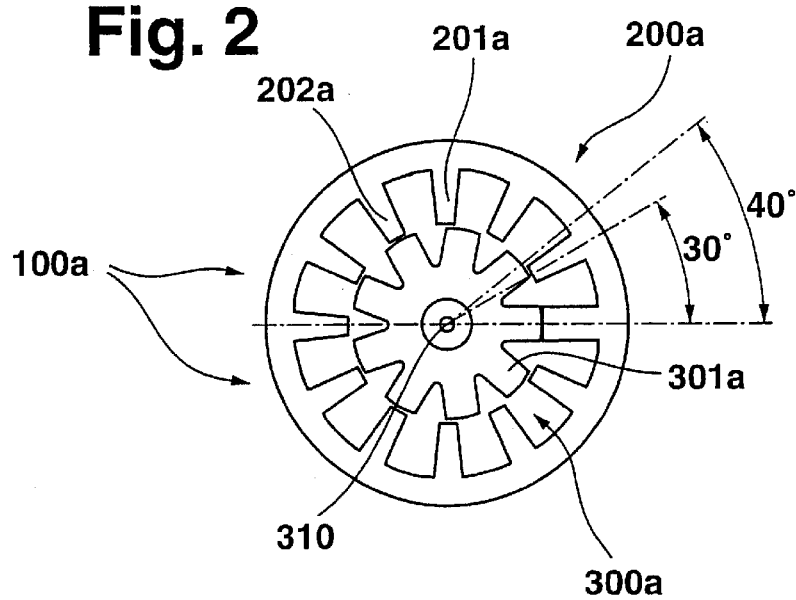
FIG. 2 is a sectional view illustrating a rotor which is aligned radial to a rotor rotational axis with nine rotor pole teeth.

The second exemplary embodiment of an electric machine 100a according to FIG. 2 has a rotor 300a, which is aligned radial to a rotor rotational axis 310, with nine rotor pole teeth 301a. These rotor pole teeth 301a are uniformly aligned with a 40° spacing a center from one another. A stator 200a has four first stator pole teeth 201a of the wider type and eight second stator pole teeth 202a of the narrower type. The stator pole teeth have uniform angular intervals of 30° and the sequence is such that a first stator pole tooth 201a is followed by two second stator pole teeth 202a. It is also clear that wide first stator pole teeth 201a are respectively spaced apart from one another by intervals of 90° on centers and coils, not shown, which are associated with the stator 200a, are connected to four phases. In comparison to the exemplary embodiment according to FIG. 1, therefore, there is a somewhat higher electronic cost associated with operating the electric machine 100a as a reluctance motor. On the other hand, rotation angles are advantageously smaller from phase to phase.

Figure 3:
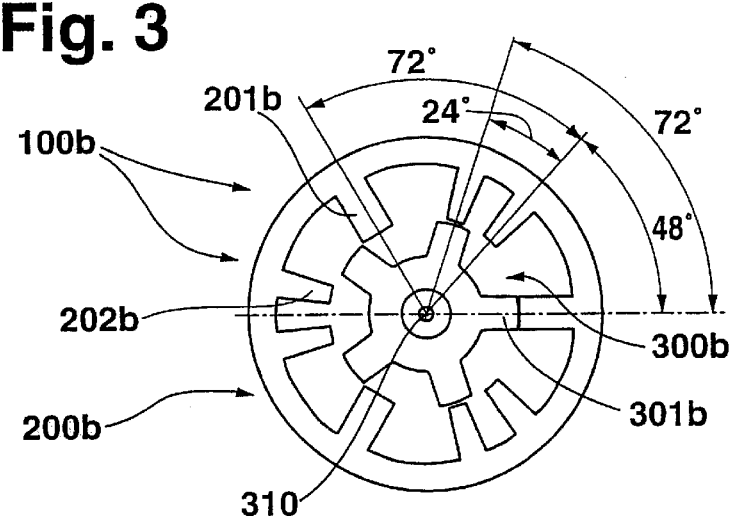
FIG. 3 illustrates a reluctance motor having a rotor with five rotor pole teeth.

The third exemplary embodiment of an electric machine such as a reluctance motor 100b according to FIG. 3 has a rotor 300b with five rotor pole teeth 301b spaced at regular angular intervals. Furthermore, this reluctance motor 100b has a stator 200b with three first stator pole teeth 201b of the wider type and with six second stator pole teeth 202b of the narrower type, i.e. that have only half the cross section. The first and therefore wider stator pole teeth 201b are spaced apart from one another by 120°. Two respective second stator pole teeth 202b of the narrower type disposed between these teeth are spaced apart from each other by angular intervals of 24°. It is clear from this that excitation coils, not shown, are connected to three phases as in the exemplary embodiment according to FIG. 1.

In the low-reluctance position of the rotor 300b inside the stator 200b, this exemplary embodiment also has three air gaps that are flowed through, which in this instance are respectively spaced apart from one another by angular intervals of 72°. It is also clear in this instance that the elastic deformation takes on a different form than in the prior art, which counteracts noise generation.

Figure 4:
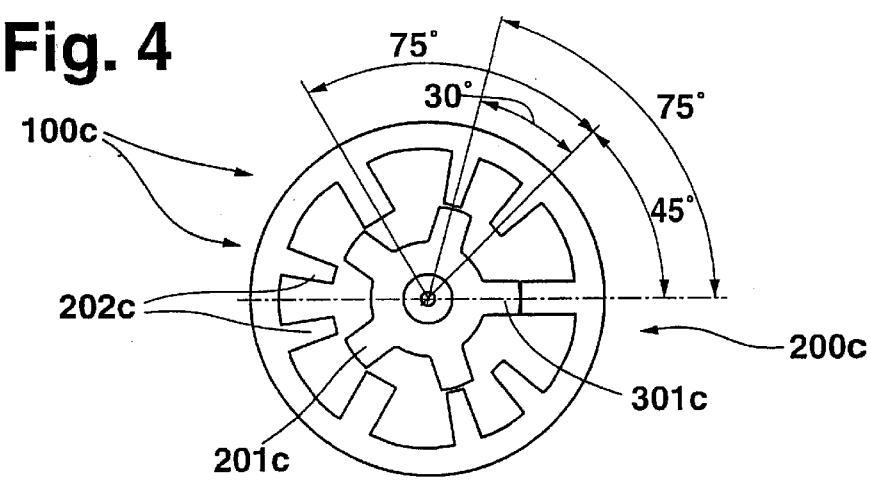
FIG. 4 illustrates a reluctance motor similar to that of FIG. 3 in which the motor has five rotor pole teeth with the teeth spaced differently.

Like the exemplary embodiment according to FIG. 3, the fourth exemplary embodiment of electric machine or the reluctance motor 100c according to FIG. 4 has five rotor pole teeth 301c. As in the exemplary embodiment of FIG. 3, the stator 200c has three first stator pole teeth 201c of the wide type, which are spaced apart from one another by angular intervals of 120°. In contrast to the exemplary embodiment according to FIG. 3, six other second stator pole teeth 202c of the narrower type are now spaced apart by 30° angular intervals. Moreover, it is once again clear in this instance that with the indicated rotational alignment of the rotor pole teeth 301c in relation to the stator pole teeth 201c and 202c, three air gaps can be flowed through and that excitation coils, not shown, are connected to three phases. FIG. 4 indicates that there is a variation possibility in the alignment of at least two second, and therefore narrower, stator pole teeth in relation to one another.

Figure 5:
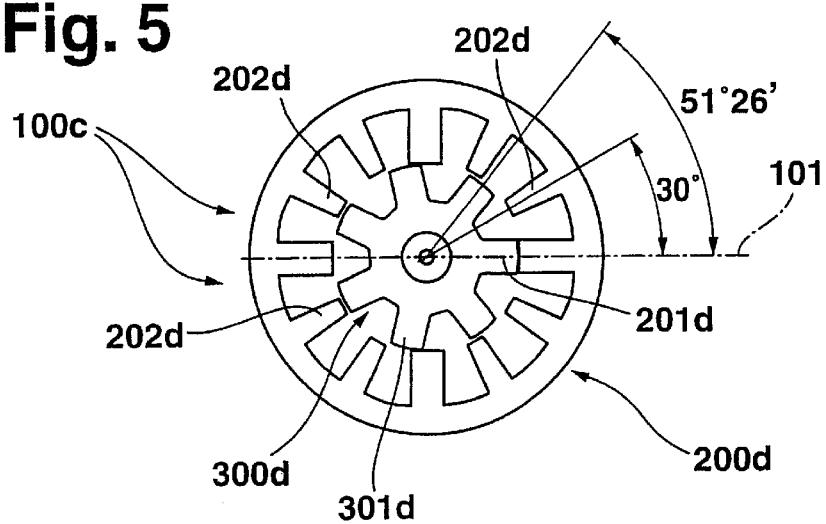
FIG. 5 illustrates a reluctance motor with seven rotor pole teeth disposed at uniform intervals on a rotor.

The fifth exemplary embodiment of an electric machine or a reluctance motor 100d according to FIG. 5 has seven rotor pole teeth 301d disposed at uniform angular intervals on a rotor 300d. As in the exemplary embodiment according to FIG. 2, a stator 200d has four first stator pole teeth 201d of the wider type and eight second stator pole teeth 202d of the narrower type. The individual stator pole teeth 201d and 202d are respectively disposed spaced apart from one another by 30° intervals. It is also clear in this instance that excitation coils, not shown, are connected to four phases and that as can be inferred from FIG. 5, in the depicted rotational alignment of the rotor 300d in relation to the stator 200d, three air gaps can be flowed through magnetically. In FIG. 5, these are comprised of a right air gap lateral to the horizontal reference plane 101 and two air gaps on the left at second stator pole teeth 202d, which between them define an angle of 60° and are each aligned symmetrically, offset by 30° in relation to this reference plane 101. In this connection, it also turns out that elastic deformations occur here that are different from those in the prior art. It is also clear that for a particular rotational alignment of the rotor 300d, there are three deformation zones in which elastic deformations occur. Here, too, it is clear that a resistance to elastic deformation is relatively high. Therefore this example can also be included in the exemplary embodiments that behave in a rigid manner and have a reduced noise generation.

What is claimed is:

1. A reluctance motor electric machine, comprising a stator (200) with a yoke body (210) forming a field body and stator pole teeth (201, 202) extending radially inward from the field body, with excitation coils (211, 212) associated with the stator pole teeth (201, 202), a rotor (300), which is supported so that the rotor rotates around a rotor axis (310) and has rotor pole teeth (301) directed radially outward that are spaced apart from one another at uniform angular intervals, a number and alignment of the stator pole teeth (201, 202) is chosen so that in rotational positions of the rotor that have minimal reluctance, by forming three pairs of pole teeth, wherein said three pairs including, three rotor pole teeth (301) are aligned in relation to three stator pole teeth (201, 202), and at least one of the stator pole teeth (201, 202) that does not belong to said three pairs is disposed between two neighboring pairs of said three pairs of rotor pole teeth (301) and stator pole teeth (201, 202), wherein said stator pole teeth and said rotor pole teeth of said three pairs respectively are disposed opposite each other, with air gaps between them.

2. The electric machine according to claim 1, wherein said stator pole teeth including first stator pole teeth and second stator pole teeth, and a reference plane (101) placed through the rotor axis (310) and thereby also through a center of one of the first stator pole teeth (201) is a symmetry plane in relation to which both of the second stator pole teeth (202) of the three pairs are aligned in mirror inverted fashion and that cross sections of both second stator pole teeth (202) which are aligned in mirror inverted fashion, essentially enclose areas that are half as great as the area enclosed by a cross section of the first stator pole tooth (201) that determines the alignment of the symmetry plane (101).

3. The electric machine according to claim 2, in which the rotor (300) has six rotor pole teeth (301) and the stator (200) has nine stator pole teeth (201, 202) that are spaced apart by angular intervals of essentially 40° on their centers.

4. The electric machine according to claim 2, in which the rotor (300a) has nine rotor pole teeth (301a) and the stator (200a) has twelve stator pole teeth (201a, 202a) that are spaced apart from one another by angular intervals of essentially 30° on their centers.

5. The electric machine according to claim 2, in which the rotor (300b) has five rotor pole teeth (301b) and the stator (200b) has nine stator pole teeth (201b, 202b) with angular intervals of essentially 48° or essentially 24°.

6. The electric machine according to claim 2, in which the rotor (300c) has five rotor pole teeth (301c) and the stator (200c) has nine stator pole teeth (201c, 202c), wherein there are different angular intervals between the stator pole teeth (201c, 202c) of essentially 30° or essentially 45°.

7. The electric machine according to claim 2, in which the rotor (300d) has seven rotor pole teeth (301d) and the stator (200d) has twelve stator pole teeth (201d, 202d) and an angular intervals between the stator pole teeth (201d, 202d) are essentially 30° on their centers.

8. The electric machine according to claim 1, in which the rotor (300) has six rotor pole teeth (301) and the stator (200) has nine stator pole teeth (201, 202) that are spaced apart by angular intervals of essentially 40° on their centers.

9. The electric machine according to claim 1, in which the rotor (300a) has nine rotor pole teeth (301a) and the stator (200a) has twelve stator pole teeth (201a, 202a) that are spaced apart from one another by angular intervals of essentially 30° on their centers.

10. The electric machine according to claim 1, in which the rotor (300b) has five rotor pole teeth (301b) and the stator (200b) has nine stator pole teeth (201b, 202b) with angular intervals of essentially 48° or essentially 24°.

11. The electric machine according to claim 1, in which the rotor (300c) has five rotor pole teeth (301c) and the stator (200c) has nine stator pole teeth (201c, 202c), wherein there are different angular intervals between the stator pole teeth (201c, 202c) of essentially 30° or essentially 45°.

12. The electric machine according to claim 1, in which the rotor (300d) has seven rotor pole teeth (301d) and the stator (200d) has twelve stator pole teeth (201d, 202d) and an angular intervals between the stator pole teeth (201d, 202d) are essentially 30° on their centers.

* * * * *